United States Patent [19]

Sheppard

[11] 3,906,837

[45] Sept. 23, 1975

[54] POWER STEERING GEAR WITH TORSION ROD VALVE CENTERING MECHANISM

[76] Inventor: Richard H. Sheppard, c/o R. H. Sheppard Co., Inc., Hanover, Pa. 17331

[22] Filed: Dec. 27, 1973

[21] Appl. No.: 428,727

[52] U.S. Cl. .................................. 91/378; 91/466
[51] Int. Cl.² ...................................... F15B 9/10
[58] Field of Search .......... 91/380, 382, 375 A, 378

[56] References Cited
UNITED STATES PATENTS

| 1,937,470 | 11/1933 | Davis | 91/378 |
|---|---|---|---|
| 2,988,059 | 6/1961 | Wysong, Jr. | 91/380 |
| 3,092,083 | 6/1963 | Sheppard | 91/378 |
| 3,195,575 | 7/1965 | Sheppard | 91/378 |
| 3,292,499 | 12/1966 | Duffy | 91/782 |
| 3,393,608 | 7/1968 | Saunders | 91/375 A |

Primary Examiner—Paul E. Maslousky
Attorney, Agent, or Firm—Lowe, King & Price

[57] ABSTRACT

A power steering device has a slidable power piston, a translatable spool valve within the piston, and a tubular externally and internally threaded input shaft passing axially through the spool valve. The external threads of the input shaft are engaged by the spool valve while the internal threads form a part of a valve centering mechanism which includes a torsion rod having one end in threaded engagement with the input shaft interior. The other end of the torsion rod is rigidly connected to the piston. The internal and external threads on the input shaft are of the same pitch.

5 Claims, 1 Drawing Figure

POWER STEERING GEAR WITH TORSION ROD VALVE CENTERING MECHANISM

FIELD OF THE INVENTION

The present invention relates generally to power steering devices of the type having a power piston controlled by a manually actuated hydraulic valve. The invention relates particularly to a centering means for the valve including a torsion rod.

BACKGROUND OF THE INVENTION

In my prior patents, U.S. Pat. Nos. 3,092,083 and 3,195,575, which utilize a slidable spool valve captured within a power piston for controlling the application of hydraulic fluid to the cylinder ends, the valve is centered within the piston by annular washer springs on opposite ends of the valve. These washer springs, while performing satisfactorily for most applications, have a tendency to show increased fatigue under extremely heavy duty application such as encountered in steering large, slow moving truck vehicles and off-the-road equipment. As a result, some of the original springiness is lost and the steering "feel" is changed. Also, during assembly, precise adjustment of the mounting means for the opposing washer springs is required to give the springs the necessary pre-load and thereby obviate hysteresis that would result if the ends of the valve were not assured of snugness against the springs, especially when the centered position is reached. The fact that the washer springs inherently have a somewhat nonlinear characteristic is also undesirable in some circumstances.

Valve centering by torsion rod force broadly has been provided in prior art power steering systems. This art, of which I am aware, utilize an external rotary hydraulic valve with a torsion rod interposed between the power steering unit and the steering input shaft. U.S. Pat. No. 3,406,773 to Luther is illustrative.

OBJECTS OF THE INVENTION

It is an object of the present invention to provide a power steering gear with valve centering mechanism of rugged design adapted for heavy duty applications.

It is a further object of the present invention to provide a rugged and compact valve centering mechanism for a power steering system of the type having a slidable spool valve within a power piston.

It is another object of the present invention to provide a valve centering mechanism having a substantially linear spring characteristic for a power steering system of the type having a slidable spool valve within a power piston.

SUMMARY OF THE INVENTION

In the present invention, a power steering unit of the type having a translatable spool valve within a power piston is provided with an integral valve centering mechanism including a torsion rod. As in my aforementioned prior patents, an input shaft terminates in an externally threaded portion in engagement with the interior of a tubular spool valve for translating the valve in response to rotation of the input shaft. The valve has external grooves which cooperate with internal grooves on the interior of the piston to selectively distribute hydraulic fluid to the cylinder ends in a manner such that the piston tends to track the translation of the spool valve.

In contradistinction to my prior patents, the input shaft provided is tubular and the interior cylindrical wall of the tube is provided with a thread of the same pitch as the external thread. There is provided within the input shaft a torsion rod having one end in threaded engagement with the internal threads of the input shaft. The other end of the torsion rod is rigidly attached to the piston. Thus, with no torque manually applied to the input shaft, translation of the piston is converted via the torsion rod to rotation of the input shaft which, in turn, effects translation of the spool valve to keep the valve centered in the piston.

Conversely, it can be said that with the arrangement of the present invention, the axial thrust of the helix thread on the torsion rod tends to directly and resiliently urge the piston to the final, precise new location after each turning operation whereby the valve is then in effect centered. This same axial thrust assists in manual translation of the piston when the vehicle is being steered in the event of failure of the hydraulics.

The torsion rod is integrated within the power steering unit in a compact manner and yet may be made sufficiently large to give the necessary force to reliably perform the centering function and to do so without tedious pre-adjustment required in the past in order to obviate the possibility of hysteresis in the response.

Other objects and features of the present invention will become apparent upon a perusal of the following detailed description of one specific embodiment thereof taken in conjunction with the appended drawing.

DETAILED DESCRIPTION OF THE DRAWING

Figure 1:
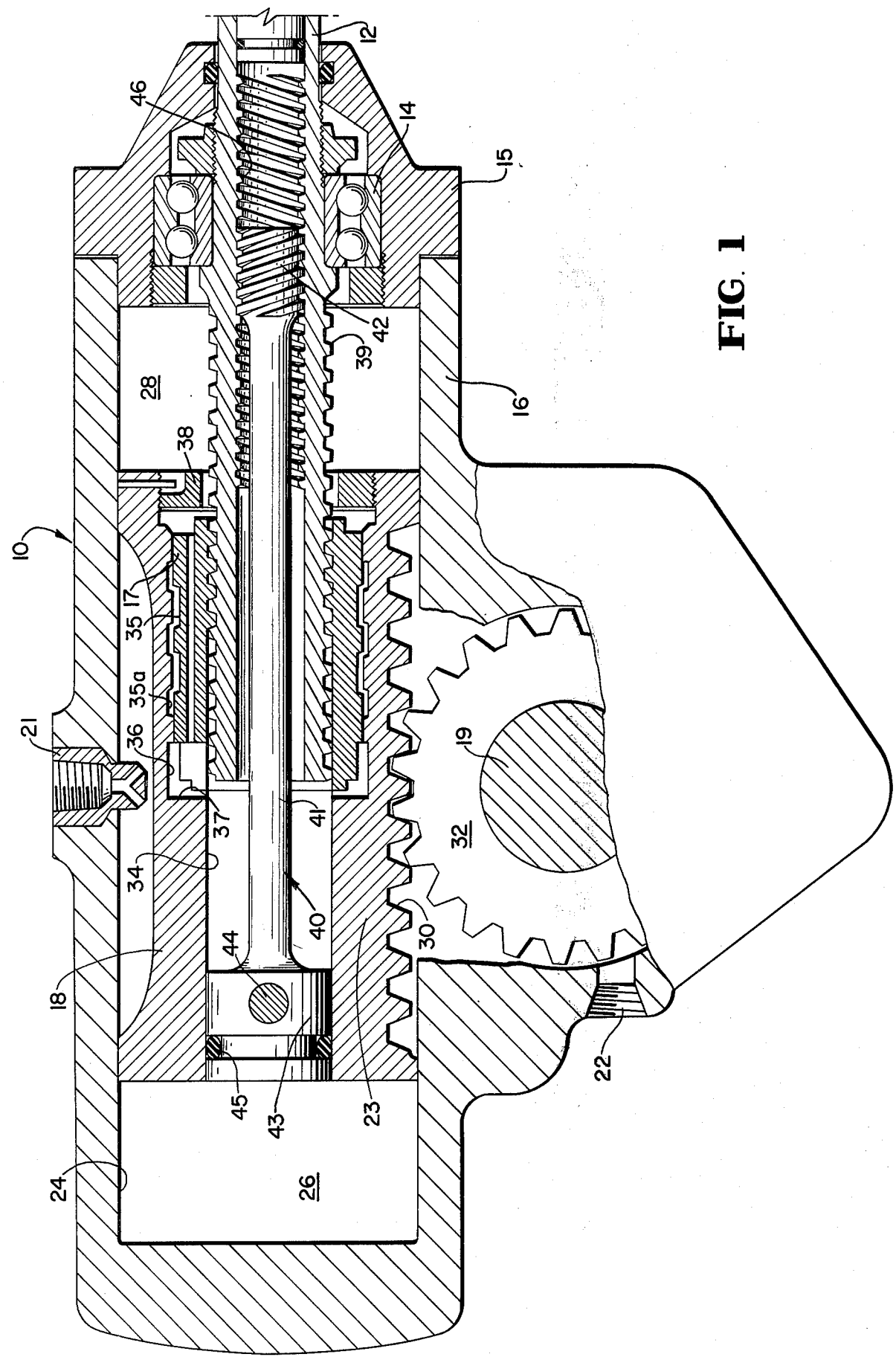
FIG. 1 is a longitudinal cross-section view of an integral power steering unit employing the torsion rod valve centering mechanism of the present invention.

Referring to FIG. 1, the power steering unit 10 of the present invention includes a manually rotatable tubular input shaft 12 journalled in bearing 14 in an end cap 15 of a generally cylindrical housing 16. Input shaft 12, which extends axially into housing 16, and the operation of which will be better understood as the discussion proceeds, translates a spool valve 17 for hydraulically controlling the reciprocation of power piston 18 that in turn effects rotation of an output cross-shaft 19. The output shaft 19 is attached to the usual steering linkage for controlling the wheels of a vehicle (not shown). It should be understood that the illustration of FIG. 1 and the present description thereof is limited to those parts necessary to fully disclose the inventive improvement concept in its preferred mode. Reference may be made to my previous patents, including U.S. Pat. No. 3,092,083 mentioned above, for further descriptive material of integral power steering units in general.

Housing 16 is further provided with inlet and outlet fittings 21 and 22 for entry of pressurized hydraulic fluid from a suitable pump source (not shown) and exhaust of fluid back to the sump (not shown), respectively. The power piston 18 in an axial bore 24 in the housing 16 slides in response to the selective application of hydraulic fluid by the spool valve 17 to chambers 26 and 28 at the ends of the piston 18. The piston 18 has rack teeth 30 facing a pinion 32 on shaft 19; the pinion 32 serving to rotate the shaft in response to sliding of the piston 18.

Piston 18 has a central bore 34 merging with a central counterbore 36 at a radial shoulder 37. Input shaft 12 extends into counterbore 36 and is radially spaced therefrom leaving an annular space. The tubular spool valve 17 is disposed in the annular space captured between shoulder 37 and an annular nut 38 threaded into the open end of counterbore 36. The final position of the nut 38 is such as to allow for a small amount of relative axial motion between valve 17 and piston 18. Valve 17 is internally threaded and positioned in engagement with external threads 39 of input shaft 12 which effects upon rotation the translation of the valve 17.

The exterior of spool valve 17 and the piston counterbore 36 are provided with cooperating annular grooves 35 and 35a, respectively, which serve to direct pressurized hydraulic fluid from inlet 21 to a selected one of chambers 26 and 28 to translate piston 18 in response to the rotation of input shaft 12. In a manner well understood to those skilled in the art, piston 18 tracks the translation of spool valve 17 tending to keep the piston counterbore 36 centered longitudinally with respect to the valve 17. Should the piston 18 not follow the spool valve within a small error permitted by the valve capturing arrangement, such as in a fast steering maneuver or upon loss of hydraulic fluid, the valve 17 strikes either shoulder 37 or nut 38, dependent on the steering direction, allowing the spool valve 17 to directly push the piston 18.

If the spool valve 17 is not precisely centered in counterbore 36, indicating an instantaneous steering error, and if the vehicle operator is not applying torque to the input shaft 12 via the usual steering wheel (not shown) it is desirable that valve 17 center itself in the counterbore 36 so as to maintain the instantaneous steering postion. It is also desirable to provide a resistance torque to shaft 12 in proportion to the relative displacement between the piston 18 and the spool valve 17 to provide the driver some feel of the road. Furthermore, it is of advantage to provide a positive leading resilient connection that has linear characteristics between the input shaft 12 and piston 18 tending to axially shift the piston 18 so that when the valve 17 strikes or bottoms out on the shoulder 37 or the nut 38, the piston has already begun to move in the proper direction thereby reducing the impact force.

In the present invention these "valve centering", "road feel" and "piston movement anticipation" functions are provided by a mechanism including a torsion rod 40 positioned along the central axis of the piston 18 coaxial with tubular input shaft 12. Torsion rod 40, along its axis, comprises a central portion 41 adapted to torsionally flex, an increased diameter end portion 42 within and threadedly engaging the threads 46 of the inside of input shaft 12 and an opposite end portion 43 having a diameter in excess of portion 41 fitting in piston bore 34. End portion 43 is rigidly attached to the piston 18 by means of a transverse pin 44 and is sealed by O-ring 45 to provide a positive separation between chambers 26 and 28.

The threads 46 on the inside surface of input shaft 12 which engage torsion rod end portion 42 are of the same pitch as the threads 39 on the outside diameter of the shaft. The two ends of the torsion rod 40 thus translate together with controlled flexure of portion 41 under conditions where piston 18 tracks the spool valve 17. This would be true in a situation of normal steering conditions, as well as under emergency or panic steering conditions. The torsion rod 40 torsionally flexing provides the precise desired reverse torque on input shaft 12, which is in proportion to the relative displacement of the spool valve 17 and thus the rate of steering.

Reviewing the operation in more detail, first assume that starting from a straight-ahead driving mode, steering is required wherein the piston 18 should move to the left turning output shaft 19 counterclockwise (see FIG. 1). The driver thus turns the input shaft 12 clockwise (looking down from the right hand or steering wheel end of shaft 12) instantaneously shifting the valve 17 to the left due to threaded connection between the valve 17 and the shaft 12 and by the fact that valve 17 is fixed against rotation, as is conventional (see Sheppard U.S. Pat. Nos. 3,092,083 and 3,195,575, mentioned above). At the same instant, the threaded end portion 42 of the torsion rod 40 tends to start to move to the left, i.e., the end portion 42 wants to move the same amount as the valve 17 moves since the pitch of threads 39 and 46 is the same. However, the end portion 42 is left behind for an instant because the piston 18 lags behind and the other end 43 of the rod 40 is rigidly connected by pin 44.

Under these conditions, the only thing the end portion 42 can do is remain bodily fixed in the axial or longitudinal direction, and consequently end portion 42 must rotate relative to the shaft 12 or counterclockwise through an arc equal to the arc moved by the shaft 12. The torsion rod 41 has now stored torsional energy tending to rotate the end portion 42 back in the clockwise direction.

During this action described above, the piston 18 is tracking the valve 17, that is moving to the left due to the unbalanced hydraulic fluid flow. That is, the valve 17 is causing chamber 28 to be pressurized and chamber 26 to be vented to the exhaust side of the pump (not shown). The torsional force of the rod 40 is translated into axial force by working against the internal threads 46 helping the piston 18 to so move. As the rod 40 unwinds, the end portion 42 walks along the threads 46 toward a new position to the left of that shown in FIG. 1. At the moment the piston 18 has caught up with the valve 17, the unbalanced fluid flow is terminated, the end portion 42 has reached its new position and the torsional stress within rod 40 to again relieved. The valve 17 is assured of being centered since until the exact point of equilibrium in the shaft 40 is reached, the new longitudinal position of the piston 18 and the new rotational position of the shaft 12 representing the new steering position of the output shaft 19 of the unit is sought by the stored torsional spring force.

The centered position of the valve 17 in piston 18 is maintained until the operator again turns the shaft 12. For example, the operator may turn the shaft 12 back counterclockwise to reach the "home" or straight ahead driving position. The valve 17 instantaneously moves right, the end portion 42 twists clockwise and piston 18 starts to move right. When rod 40 is again unstressed, the valve 17 and piston 18 are once again centered as shown in FIG. 1, in readiness for the next steering operation.

It is thus apparent that the torsion rod mechanism, which has been compactly integrated into the piston 18 of the power steering unit 10, provides also improved functional results and advantages. The torsion rod 40, which may be provided of appropriate length and diameter to be maintained below critical stress levels while providing an appropriate resistance torque rate to the input shaft, is inexpensively manufactured and easy to install since no pre-loading is required. The linear spring rate assures proper proportional "feel", as well as accurate operation with precise centering of the valve 17.

Thus, having described and illustrated one specific embodiment of my invention in detail it should be apparent that numerous modifications are possible within its spirit and scope. Accordingly, it is intended that the details of this specific embodiment be viewed as illustrative of the concept of my invention defined in the appended claims.

What is claimed is:

1. In a power steering device including a housing, rotatable input and output shafts carried by said housing, a piston slidable within said housing and coupled in driving relationship to said output shaft, a spool valve translatable within said piston, hydraulic means for sliding the piston in response to the translation of the spool valve, and said input shaft including a threaded portion passing through said spool valve and in threaded engagement with the valve for translating the same, the improvement comprising a torsion rod within said input shaft, a first end of said torsion rod being connected to said piston and means for coupling the second end of said torsion rod to said shaft so as to cause centering of said valve.

2. The device of claim 1 wherein the first torsion rod end is rigidly connected to said piston.

3. The device of claim 2 wherein said coupling means comprises a threaded engagement between said input shaft and said second torsion rod end.

4. The device of claim 3 wherein the threaded engagement between the input shaft and spool valve is of the same pitch as the threaded engagement between the input shaft and the second torsion rod end.

5. A power steering device comprising:
- a tubular internally threaded input shaft, an output shaft, a power piston in driving relationship with the output shaft, hydraulic valve means coupled to said input shaft for hydraulically sliding said piston in response to rotation of said input shaft; and
- a torsion rod within said input shaft having one end in threaded engagement with the interior of said input shaft and the other end connected to said piston.

* * * * *